US011978115B2

United States Patent
Guo et al.

(10) Patent No.: US 11,978,115 B2
(45) Date of Patent: May 7, 2024

(54) METHOD, DEVICE, AND STORAGE MEDIUM FOR BLOCKCHAIN DATA PROCESSING

(71) Applicant: Tencent Technology (Shenzhen) Company Limited, Shenzhen (CN)

(72) Inventors: Rui Guo, Shenzhen (CN); Yige Cai, Shenzhen (CN); Maocai Li, Shenzhen (CN); Qing Qin, Shenzhen (CN); Jianjun Zhang, Shenzhen (CN); Zongyou Wang, Shenzhen (CN); Zichao Tang, Shenzhen (CN); Qingzheng Shang, Shenzhen (CN); Chen Yang, Shenzhen (CN); Li Kong, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 417 days.

(21) Appl. No.: 17/231,471

(22) Filed: Apr. 15, 2021

(65) Prior Publication Data

US 2021/0248675 A1    Aug. 12, 2021

Related U.S. Application Data

(63) Continuation of application No. PCT/CN2019/120957, filed on Nov. 26, 2019.

(30) Foreign Application Priority Data

Dec. 5, 2018    (CN) .......................... 201811483001.0

(51) Int. Cl.
*G06Q 20/02*    (2012.01)
*G06Q 20/10*    (2012.01)
(Continued)

(52) U.S. Cl.
CPC ....... *G06Q 40/03* (2023.01); *G06Q 20/38215* (2013.01); *G06Q 20/3825* (2013.01);
(Continued)

(58) Field of Classification Search
CPC ............. G06Q 40/03; G06Q 20/38215; G06Q 20/3825; G06Q 20/3829; G06Q 20/02;
(Continued)

(56) References Cited

U.S. PATENT DOCUMENTS

| 10,255,768 B2* | 4/2019 | Basu .................. G06Q 20/3572 |
| 11,392,955 B2* | 7/2022 | Thomas ............. G06Q 20/0855 |
| 2017/0132615 A1 | 5/2017 | Castinado et al. |

FOREIGN PATENT DOCUMENTS

| CN | 107038578 A | 8/2017 |
| CN | 107220820 A | 9/2017 |

(Continued)

OTHER PUBLICATIONS

International Search Report and Written Opinion with English Translation for International Patent Application No. PCT/CN2019/120957 dated Feb. 28, 2020; 12 pages.
(Continued)

*Primary Examiner* — Clifford B Madamba
(74) *Attorney, Agent, or Firm* — Crowell & Moring LLP

(57) ABSTRACT

A method for transferring a credit rights certificate is provided, including: generating a target account address according to a debtor account address and a creditor account address in a credit rights certificate transfer request, the target account address being a temporary account address used for storing a credit rights certificate and based on a multi-digital-signature process; transferring a credit rights certificate corresponding to the credit rights certificate transfer request from the debtor account address to the target account address; and transferring the credit rights certificate
(Continued)

Blockchain system, for example, the system may include servers of institutions in an alliance from the target account address to the creditor account address based on a confirmation instruction from the creditor account address.

12 Claims, 9 Drawing Sheets

(51) Int. Cl.
*G06Q 20/38* (2012.01)
*G06Q 40/02* (2023.01)
*G06Q 40/03* (2023.01)
*G06Q 40/04* (2012.01)
*H04L 9/06* (2006.01)
*H04L 9/08* (2006.01)
*H04L 9/32* (2006.01)
*H04L 9/00* (2022.01)

(52) U.S. Cl.
CPC ....... *G06Q 20/3829* (2013.01); *H04L 9/0643* (2013.01); *H04L 9/50* (2022.05)

(58) Field of Classification Search
CPC ............... G06Q 20/10; G06Q 20/3821; G06Q 2220/00; G06Q 40/02; G06Q 40/04; H04L 9/0643; H04L 9/50; H04L 9/0825; H04L 9/0861; H04L 9/3255; H04L 9/3263; H04L 2209/56
USPC .......................................................... 705/38
See application file for complete search history.

(56) References Cited

FOREIGN PATENT DOCUMENTS

| | | |
|---|---|---|
| CN | 107301536 A | 10/2017 |
| CN | 107424073 A | 12/2017 |
| CN | 108009811 A | 5/2018 |
| CN | 108428122 A | 8/2018 |
| CN | 108876497 A | 11/2018 |
| CN | 109615515 A | 4/2019 |

OTHER PUBLICATIONS

Office Action with English Translation of Concise Explanation of Relevance for Chinese Patent Application No. 201811483001.0 dated Jan. 19, 2021; 8 pages.

* cited by examiner

METHOD, DEVICE, AND STORAGE MEDIUM FOR BLOCKCHAIN DATA PROCESSING

RELATED APPLICATION

This application is a continuation application of the International PCT Application No. PCT/CN2019/120957, filed with the China National Intellectual Property Administration, PRC on Nov. 26, 2019 which claims priority to Chinese Patent Application No. 201811483001.0, filed with the China National Intellectual Property Administration, PRC on Dec. 5, 2018, both of which are incorporated herein by reference in their entireties.

FIELD OF THE TECHNOLOGY

This application relates to the field of blockchain technologies, and in particular, to a method, an apparatus, an electronic device, and a storage medium for data processing in blockchain.

BACKGROUND OF THE DISCLOSURE

The blockchain technology is being applied to many fields such as finance, information security, computing resource sharing, entertainment, social networking, supply chain management, medical treatment, etc.

In a scenario of supply chain finance, a supplier may hold a credit rights certificate. When the credit rights certificate expires, a core enterprise corresponding to the credit rights certificate needs to pay the supplier the amount due as indicated in the credit rights certificate. The supplier may alternatively transfer the credit rights certificate to another institution. For example, the supplier may transfer the credit rights certificate to an upper-level supplier, or the supplier may discount the credit rights certificate and transfer the discounted credit rights certificate to a financial institution, to obtain corresponding funds. After the supplier applies for a credit rights certificate transfer, the upper-level supplier or the financial institution needs to confirm the acceptance after a period of time. Therefore, a transfer method for a credit rights certificate is urgently needed, to ensure the security in a process of transferring the credit rights certificate, and guarantee the rights of both parties in the transfer.

SUMMARY

A transfer method for a credit rights certificate is provided, including:
  generating a target account address according to a debtor account address and a creditor account address in a credit rights certificate transfer request, the target account address being a temporary account address used for storing a credit rights certificate;
  transferring a credit rights certificate corresponding to the credit rights certificate transfer request from the debtor account address to the target account address; and
  transferring the credit rights certificate from the target account address to the creditor account address based on a confirmation instruction from the creditor account address.

A transfer apparatus for a credit rights certificate is provided, including:
  a generation module, configured to generate a target account address according to a debtor account address and a creditor account address in a credit rights certificate transfer request, the target account address being a temporary account address used for storing a credit rights certificate; and
  a transfer module, configured to transfer a credit rights certificate corresponding to the credit rights certificate transfer request from the debtor account address to the target account address,
  the transfer module being further configured to transfer the credit rights certificate from the target account address to the creditor account address based on a confirmation instruction from the creditor account address.

An electronic device is provided, including a processor and a memory, the memory storing at least one computer-readable instruction, and the computer-readable instruction being loaded and executed by the processor to implement the following operations:
  generating a target account address according to a debtor account address and a creditor account address in a credit rights certificate transfer request, the target account address being a temporary account address used for storing a credit rights certificate;
  transferring a credit rights certificate corresponding to the credit rights certificate transfer request from the debtor account address to the target account address; and
  transferring the credit rights certificate from the target account address to the creditor account address based on a confirmation instruction from the creditor account address.

A non-transitory computer-readable storage medium is provided, storing at least one computer-readable instruction, the computer-readable instruction being loaded and executed by a processor to implement the following operations:
  generating a target account address according to a debtor account address and a creditor account address in a credit rights certificate transfer request, the target account address being a temporary account address used for storing a credit rights certificate;
  transferring a credit rights certificate corresponding to the credit rights certificate transfer request from the debtor account address to the target account address; and
  transferring the credit rights certificate from the target account address to the creditor account address based on a confirmation instruction from the creditor account address.

BRIEF DESCRIPTION OF THE DRAWINGS

To describe the technical solutions of the embodiments of this disclosure more clearly, the following briefly introduces the accompanying drawings required for describing the embodiments. The accompanying drawings in the following description show merely some example embodiments of this disclosure, and a person of ordinary skill in the art may still derive other drawings from the accompanying drawings without creative efforts.

DESCRIPTION OF EMBODIMENTS

To make the objectives, technical solutions, and advantages of this application clearer, the following further describes implementations of this application in detail with reference to the accompanying drawings.

Figure 1:
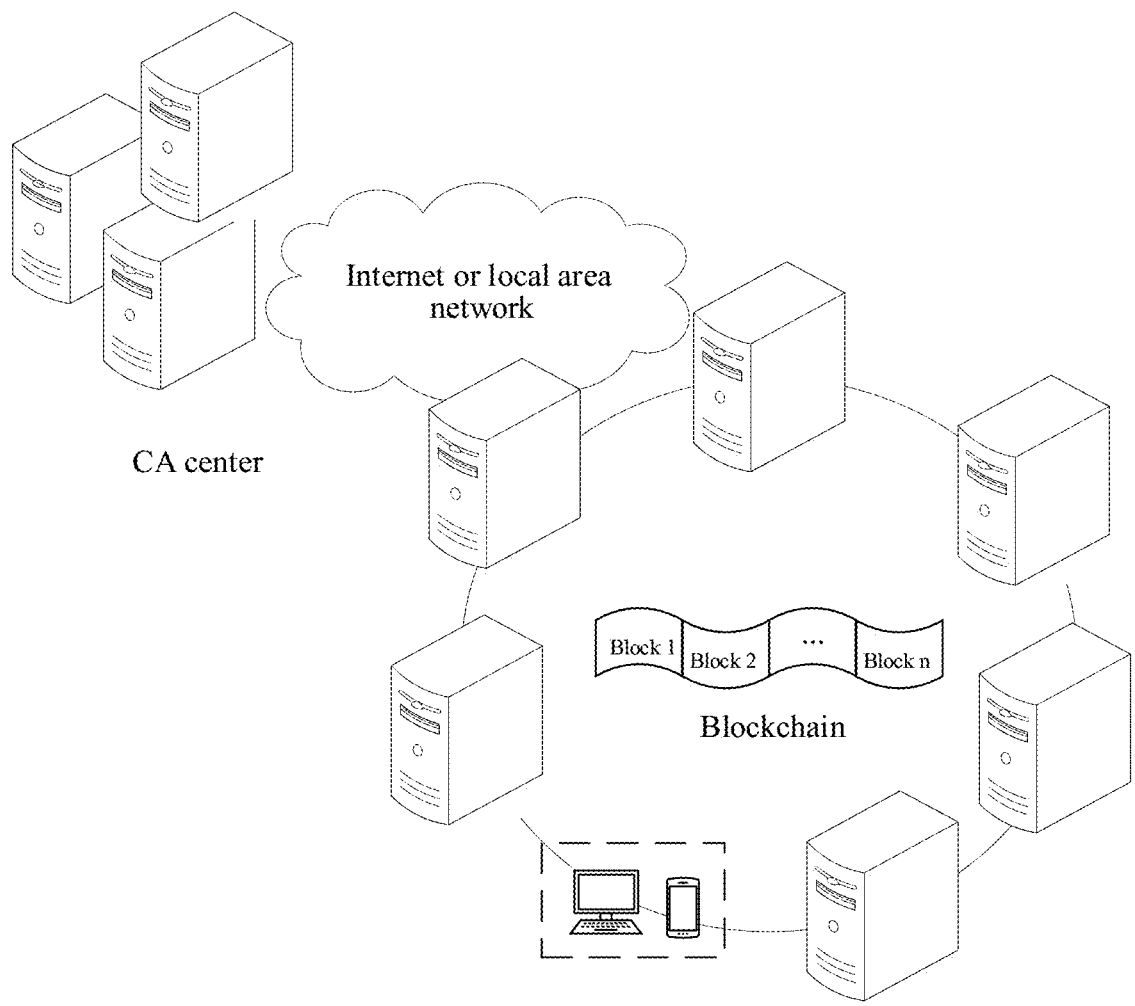
FIG. 1 is a diagram of an implementation environment of a transfer method for a credit rights certificate according to an embodiment of this disclosure.
Figure 2:
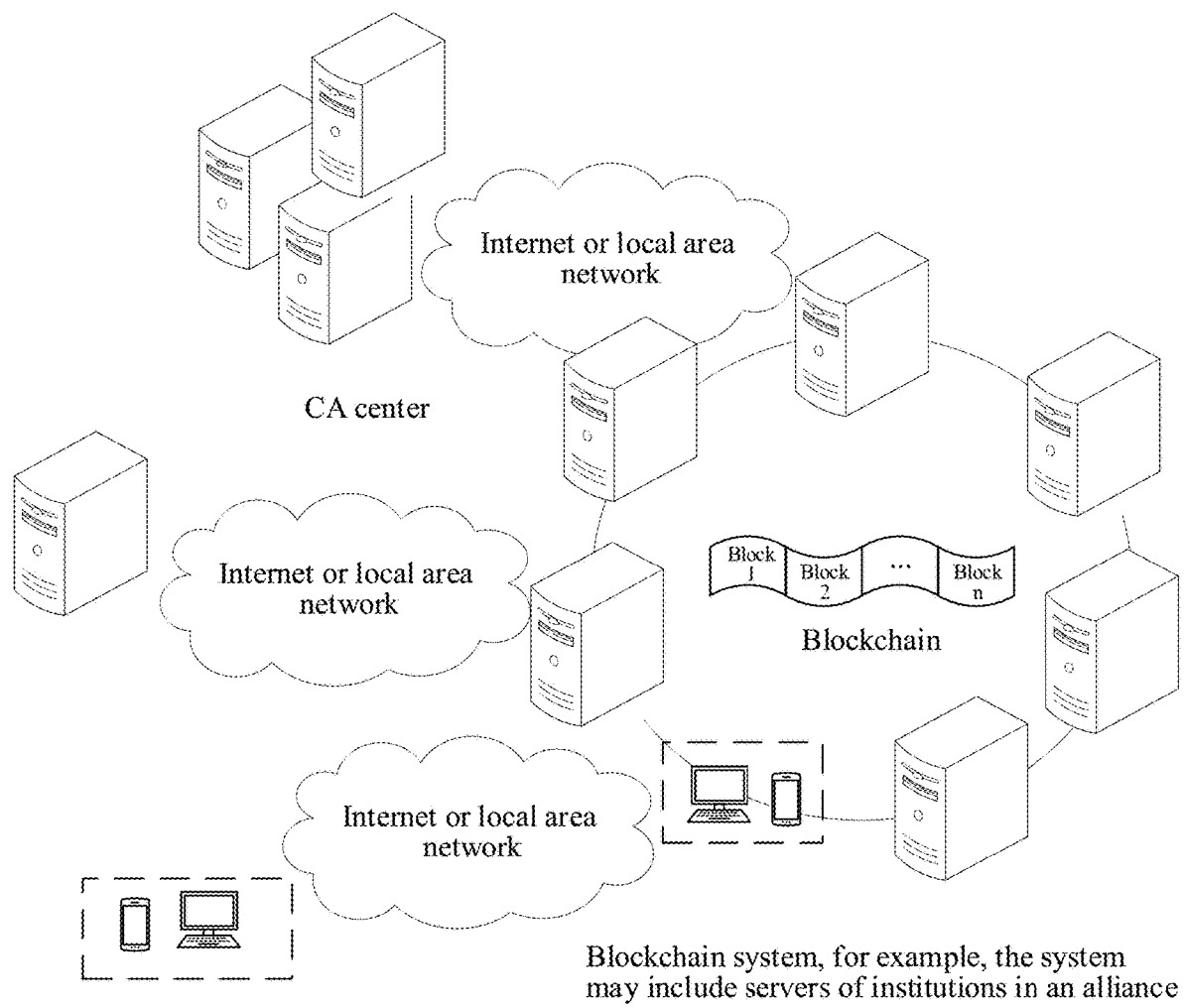
FIG. 2 is a diagram of an implementation environment of a transfer method for a credit rights certificate according to an embodiment of this disclosure.

FIG. 1 and FIG. 2 are diagrams of an implementation environment of a transfer method for a credit rights certificate according to an embodiment of this disclosure. Referring to FIG. 1 and FIG. 2, a plurality of electronic devices may be included in the implementation environment, and each electronic device may include a terminal or a server. As shown in FIG. 1, the plurality of electronic devices may include a plurality of node devices in a blockchain system. As shown in FIG. 2, the plurality of electronic devices may also include electronic devices outside the blockchain system and the plurality of node devices in the blockchain system. The exemplary transfer method for a credit rights certificate provided in the embodiments of this disclosure is described in a manner in which the method is applicable to a node device in a blockchain system. However a specific implementation adopted is not limited in the embodiments of this disclosure The plurality of electronic devices in the blockchain system may be a plurality of node devices belonging to the same institution or different institutions. For example, the plurality of electronic devices may all belong to a financial institution, and the plurality of electronic devices may belong to different departments of the financial institution. Alternatively, one or more of the electronic devices are user equipment, and one or more of the electronic devices belong to the financial institution. Certainly, another electronic device may alternatively belong to another institution such as an asset management institution. Details are not listed one by one in the embodiments of this disclosure.

In a supply chain financial scenario, the plurality of electronic devices may correspond to different institutions such as a core enterprise, a supplier, an asset management institution, a financial institution and another institution having a contract relationship with the financial institution. A device of the asset management institution may be deployed with an asset management platform. A device of the financial institution or another institution having a contract relationship with a financial institution may be a resource transfer device.

The asset management platform may review a credit rights certificate generation request or a credit rights certificate transfer request submitted by the supplier, and generate a credit rights certificate if the review passes. The asset management platform may alternatively implement a resource transfer together with a resource transfer device based on the credit rights certificate when the credit rights certificate expires. In a scenario of transferring the credit rights certificate, there may further be a certain generation condition for generating a new credit rights certificate when the generation condition is met. For example, a certain quantity of resources need to be transferred before the new credit rights certificate is available or valid.

The resource transfer device may maintain resource information of a plurality of account addresses, or perform a resource transfer on resources of an account address. Certainly, the resource transfer device may alternatively be a device helping to implement the resource transfer, and may implement a resource transfer function by using a resource transfer interface provided by the financial institution. In the embodiments of this disclosure, the asset management platform may transmit a resource transfer request to the resource transfer device, and the resource transfer device provides a resource transfer service for the asset management platform.

The device hosting the asset management platform and the resource transfer device may be node devices in the blockchain system. Similarly a device of the core enterprise and a device of the supplier may also be node devices in the blockchain system. The device of the core enterprise and the device of the supplier may as well be node devices outside the blockchain system. This is not limited in the embodiments of this disclosure. In one implementation, the asset management platform may be deployed on an electronic device or may be distributed on a plurality of electronic devices, for example, the asset management platform may be deployed on a server, or may be deployed on a server cluster. In this disclosure, both the server and the server cluster may be referred to as the device at which the asset management platform is located.

To perform services such as security verification and permission management, the blockchain system may be configured with a certificate authority (CA) center, configured to store secret keys of institutions. Electronic devices in the blockchain system may obtain the secret keys of various institutions from the CA center to perform functions such as encryption and decryption on information.

The following further describes terms used in the embodiments of this disclosure and a specific application scenario of the transfer method for a credit rights certificate.

The credit rights certificate may be a digital asset. The credit rights certificate usually has an expiration date. At the expiration date of the credit rights certificate, a debtor may transfer resources in the credit rights certificate to a creditor. In this disclosure, an account address corresponds to an account and an account may alternatively be referred to as an account address. A process of generating the credit rights certificate may be as follows.

Figure 3:
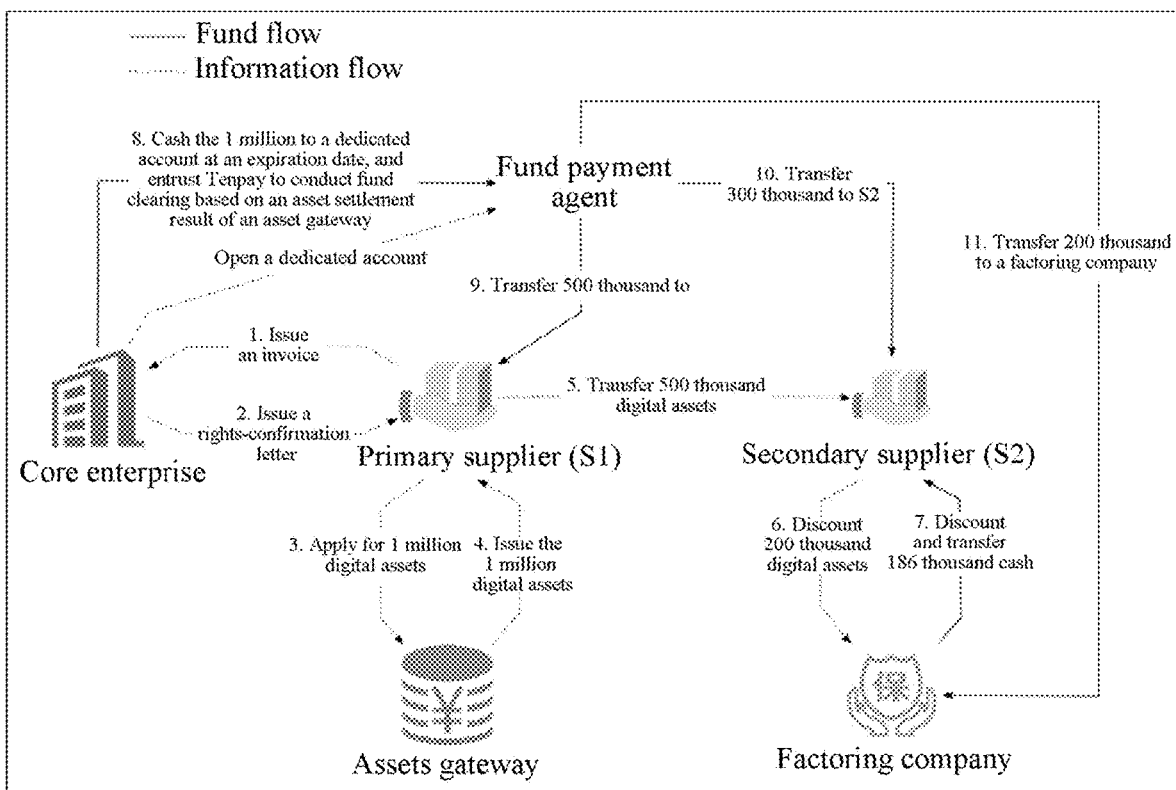
FIG. 3 is a diagram of an application scenario of a transfer method for a credit rights certificate according to an embodiment of this disclosure.

A first account address submits a request, and a first credit rights certificate for the first account address is generated by a blockchain system if a second account address is confirmed. The confirmation may be, for example, that the second account confirms the first credit rights certificate to be valid. The first credit rights certificate is used for representing that a first resource of the second account address needs to be transferred to the first account address at an expiration date. Specifically, the credit rights certificate may be a digital asset in a held-to-maturity business. A supplier may hold the credit rights certificate, and a core enterprise may pay the supplier the amount due as indicated in the credit rights certificate at the expiration date of the credit rights certificate. Therefore, the credit rights certificate may be an electronic rights-confirmation letter, that is, accounts receivable held by the supplier after the core enterprise confirms the rights. For example, as shown in FIG. 3, a primary supplier applies for 1 million digital asset. The 1 million digital assets are issued by the blockchain if the core enterprise confirms the rights, and the 1 million digital assets are the first credit rights certificate.

Certainly, in the period of time in which the supplier holds the credit rights certificate, the credit rights certificate may alternatively be transferred to another institution partially or entirely, for example, may be transferred to an upper-level supplier or a financial institution. Correspondingly, the credit rights certificate may be transferred in different manners, which may specifically include the following two types.

In a first manner, the first account address submits a request based on the first credit rights certificate. The blockchain system generates a second credit rights certificate for a third account address. The second credit rights certificate is used for representing that a second resource in the first resource of the first account address is transferred to the third account address at the expiration date. That is, the first account address transfers the resources in the held credit rights certificate partially or entirely to the third account address. The first account address is a creditor account address, and the third account address is a debtor account address. For example, as shown in FIG. 3, the primary supplier (S1) holds 1 million digital assets of a core enterprise. The 1 million digital assets are a credit rights certificate. The primary supplier transfers 500 thousand digital assets in the 1 million digital assets to a secondary supplier (S2), then the secondary supplier holds another credit rights certificate of the primary supplier. The two credit rights certificates are associated with each other, and the credit rights certificate held by the secondary supplier is the foregoing transferred 500 thousand digital assets. The foregoing process is that the primary supplier transfers the second credit rights certificate to the secondary supplier.

In a second manner, the first account address or the third account address submits a request based on a held credit rights certificate, and the blockchain system generates a third credit rights certificate. The third credit rights certificate is used for representing that a third resource in a first resource or a second resource is transferred to a fourth account address at a target time. The fourth account address needs to transfer a fourth resource to the first account address or the third account address to obtain the third credit rights certificate. The fourth account address is a creditor account address, and the first account address or the third account address is a debtor account address. After the fourth account address performs the resource transfer, the third credit rights certificate becomes valid and available to the fourth account address. For example, a primary supplier and a secondary supplier may discount the held digital assets. The discounting process may be a process of transferring credit rights certificate. Suppliers may transfer the resources in the held credit rights certificate partially or entirely to a financial institution or another institution having a contract relationship with the financial institution. The financial institution or the other institution charges a certain processing fee for processing the discount, and may pay the supplier less funds than the amount of the transferred digital assets, so that the financial institution or the other institution may hold the transferred credit rights certificate.

For example, as shown in FIG. 3, the secondary supplier holds 500 thousand digital assets of the primary supplier, and applies to a factoring company or a bank for discounting 200 thousand digital assets in the 500 thousand digital assets. The factoring company or the bank may charge a certain processing fee, for example, 14 thousand digital assets, and then the factoring company or the bank may pay 186 thousand funds to the secondary supplier when confirming to sign for acceptance of the 200 thousand digital assets. The funds are not paid in the future, but are paid immediately to the secondary supplier, so that the factoring company or the bank can hold the 200 thousand digital assets, and the 200 thousand digital assets are available and valid.

The credit rights certificate transfer manner is only exemplarily described by using the foregoing two manners. The credit rights certificate may further include other transfer manners. This is not limited in the embodiments of this disclosure. The specific procedures of the foregoing two types of credit rights certificate transfer are described below through the embodiments shown in FIG. 4 and FIG. 9. The embodiment shown in FIG. 4 corresponds to the second manner, and the embodiment shown in FIG. 9 corresponds to the first manner.

Figure 4:
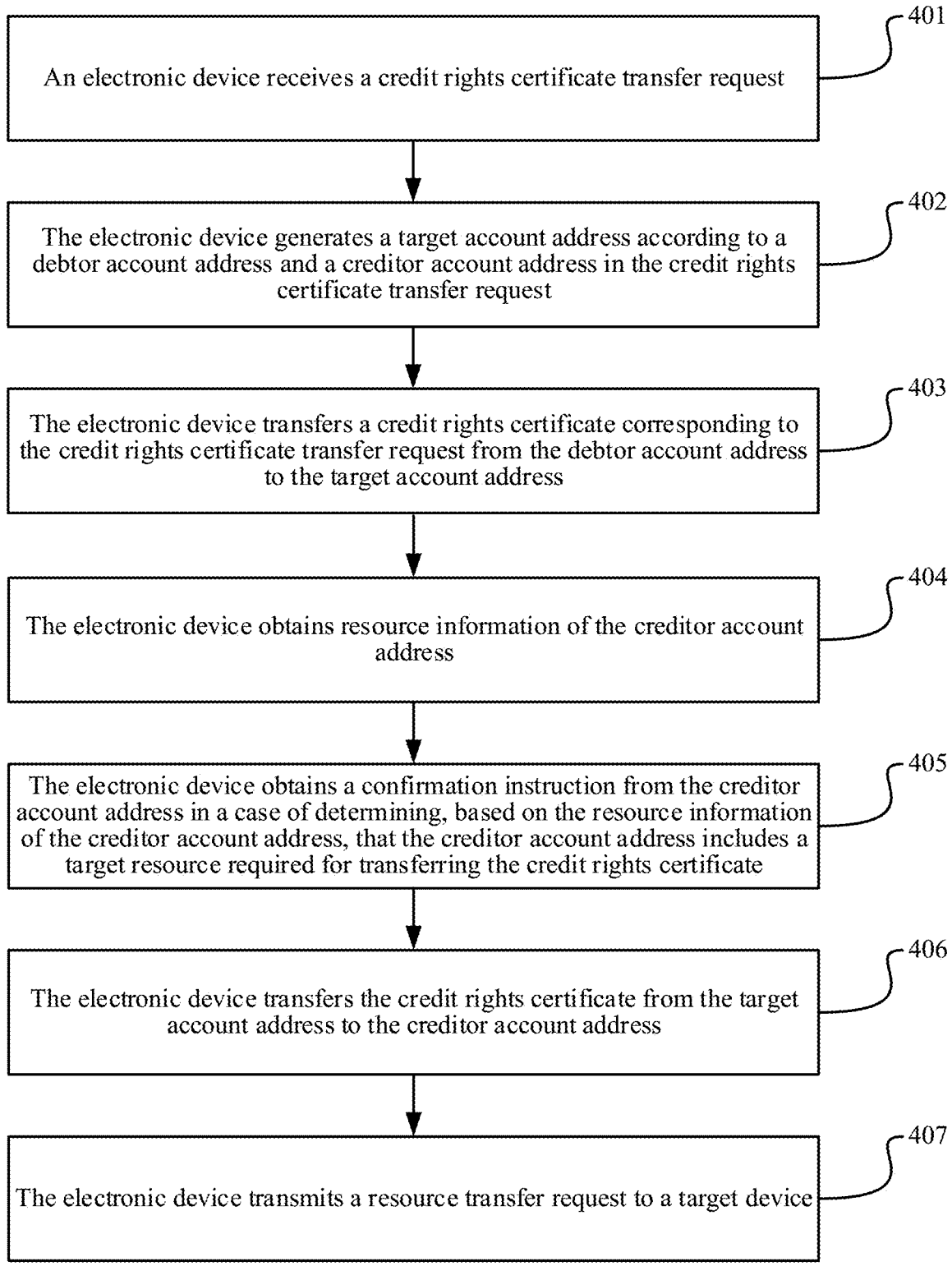
FIG. 4 is a flowchart of a transfer method for a credit rights certificate according to an embodiment of this disclosure.

FIG. 4 is a flowchart of a transfer method for a credit rights certificate according to an embodiment of this disclosure. The transfer method for a credit rights certificate is applicable to an electronic device, and the electronic device may be a node device in a blockchain system. In a possible implementation, the electronic device may be a device at which the foregoing asset management platform is located or deployed. Referring to FIG. 4, the transfer method for a credit rights certificate may include the following steps.

401. An electronic device receives a credit rights certificate transfer request.

In this embodiment of this disclosure, the electronic device may provide a credit rights certificate transfer service. The electronic device may receive the credit rights certificate transfer request, so as to perform a credit rights certificate transfer on a credit rights certificate corresponding to the credit rights certificate transfer request according to the credit rights certificate transfer request, further to implement the foregoing credit rights certificate transfer service.

Specifically, when another electronic device needs to perform a credit rights certificate transfer, a credit rights certificate transfer request may be transmitted to the electronic device, so that the electronic device receives the credit rights certificate transfer request. The credit rights certificate transfer request may include a debtor account address and a creditor account address. The credit rights certificate transfer request may further include an expiration date and a to-be-transferred resource of a credit rights certificate corresponding to the credit rights certificate transfer request.

In a possible implementation, the credit rights certificate corresponding to the credit rights certificate transfer request may be an existing credit rights certificate in the foregoing debtor account address. For example, a secondary supplier holds 500 thousand digital assets of a primary supplier, and the secondary supplier wants to discount the 500 thousand digital assets, that is, to transfer the 500 thousand digital assets to a bank or a factoring company. Correspondingly, the bank or the factoring company pays the secondary supplier funds less than 500 thousand due to the need to charge a certain processing fee. The 500 thousand digital assets are an existing credit rights certificate in the debtor account address.

In another possible implementation, the credit rights certificate corresponding to the credit rights certificate transfer request may be a new credit rights certificate generated based on the existing credit rights certificate in the debtor account address. For example, a secondary supplier holds 500 thousand digital assets of a primary supplier, and the secondary supplier wants to discount the 200 thousand digital assets in the 500 thousand digital assets, that is, to transfer the 200 thousand digital assets to a bank or a factoring company. Correspondingly, the bank or the factoring company pays the secondary supplier funds less than 200 thousand such as 186 thousand due to the need to charge a certain processing fee. The 200 thousand digital assets are a new credit rights certificate generated based on the existing credit rights certificate.

The two possibly included implementations of the credit rights certificate corresponding to the credit rights certificate transfer request are described in the above. This is not limited in the embodiments of this disclosure.

402. The electronic device generates a target account address according to a debtor account address and a creditor account address in the credit rights certificate transfer request.

The target account address is a temporary account address used for storing the credit rights certificate. The target account address may be regarded as an intermediate account address of the debtor account address and the creditor account address. When the creditor account address does not confirm to sign for acceptance of the credit rights certificate, the credit rights certificate may be stored temporarily by using the intermediate account address, so that it may be ensured that the credit rights certificate is not repeatedly transferred in a period of time in which the credit rights certificate needs to be transferred but the creditor account address does not sign for acceptance of the credit rights certificate. Compared with directly transferring the credit rights certificate to the creditor account address, it may also ensure that there is no further processing on the credit rights certificate before the creditor account address signs for the credit rights certificate, so that the security in the process of transferring the credit rights certificate may be guaranteed by using the target account address and the rights of both parties in the transfer are guaranteed.

For the target account address, both parties in the transfer (the debtor account address and the creditor account address) may have a permission to handle resources in the target account address. The resource processing may be specifically implemented by using a multi-signature technology. Multiple parties may jointly manage assets through the multi-signature technology (or multi-digital-signature process or technology). The multi-signature technology may alternatively be used for a third-party transaction guarantee. That is, the multi-signature technology allows the multiple parties to jointly manage assets in the same address. The multi-signature technology may be an M-N multi-signature technology, or referred to as M of N mode, M being a quantity of private keys at least required for unlocking an address, and N being a quantity of managers holding the private keys. For example, a value range of M may be [1, 16], and a value range of N may be [1, N] where N is greater than or equals to M. For example, the M of N mode may include 1 of 2, 1 of 3, 2 of 3, 3 of 3, where 1 of 3 may represent that any one of three managers may handle the assets in the address alone, 2 of 3 may represent that two of the three managers need to sign together to handle the assets in the address, and 3 of 3 may represent that all of the three managers need to sign to handle the assets in the address.

For example, in this embodiment of this disclosure, a 1-2 multi-signature technology may be adopted, that is, two pairs of secret keys are generated for the target account address, and each pair of the secret keys may include one private key and one public key. If M is 1, it means that one of the two public keys may be used for unlocking. Certainly, the public key needs to be a public key corresponding to a private key used for locking. The two private keys may be held by both parties in the credit rights certificate transfer. In this case, both the debtor account and the creditor account may handle the resources in the target account address. In a possible implementation, the terminal may also generate two private keys and one public key for the target account address. The public key may be used for unlocking information locked by any one of the two private keys. A specific possible implementation adopted is not limited in this embodiment of this disclosure, and the values of M and N if the multi-signature technology is adopted are not specifically limited.

Specifically, a process of generating the target account address by the electronic device may include a plurality of manners. The process of generating the target account address is described in the following in two manners.

In a first manner, the electronic device may generate the public key of the target account address according to the account addresses of both parties in the credit rights certificate transfer, then generate the target account address according to the public key. Specifically, in the first manner, the process of generating the target account address by the electronic device may be implemented through the following step 1 and step 2.

Step 1. The electronic device may generate the public key of the target account address according to a public key of the debtor account address and a public key of the creditor account address.

In step 1, both the parties (the debtor account address and the creditor account address) in the transfer may have permissions to handle resources in the target account address. The electronic device may use both the public key of the debtor account address and the public key of the creditor account address as the public keys of the target account address. That is, the target account address includes two public keys: the public key of the debtor account address and the public key of the creditor account address. In this way, when receiving a processing instruction encrypted by using a private key for the target account address, the electronic device may use one of the two public keys to decrypt the private key as long as one of the public keys can successfully decrypt the processing instruction. The private key may also be referred to as private key signature, and subsequently, a transmitting party of the processing instruction can may be determined based on the private key signature, and therefore, an initiation party of the processing procedure is determined.

In another implementation, the processing instruction needs to be encrypted based on the above two private keys. The electronic device may correspondingly process the target account address only when successfully decrypting the two private keys by using the two corresponding public keys. That is, the processing instruction needs to carry private key signatures of the debtor account address and the creditor account address. A specific implementation is not limited in this embodiment of this disclosure.

In another implementation, the target account address may have one public key. In this case, the electronic device may generate a new public key for the target account according to two public keys of the debtor account address and the creditor account address. If the processing instruction is an instruction encrypted based on a private key of the debtor account address or the creditor account address, the electronic device may decrypt the processing instruction by using the new public key to obtain specific content of the processing instruction.

Step 2. The electronic device generates an account address of the target account address based on the public key of the target account address.

Specifically, in step 2, the electronic device may calculate the public key of the target account address through a one-way hash function to obtain the account address of the target account address. A specific hash function adopted in the process of generating the account address is not limited in this embodiment of this disclosure. In this way, the electronic device generates the target account address through the foregoing step 1 and step 2, and it may be determined, through the public key of the target account address, that a processing permission of the target account address is granted to the foregoing parties in the transfer.

In a second manner, the electronic device may generate the target account address first. Considering the processing permission of the target account address, a public key may further be set for the target account address according to the public key of the debtor account address and the public key of the creditor account address. Specifically, in the second manner, the process of generating the target account address by the electronic device may be implemented through the following step 1 and step 2.

Step 1. The electronic device generates the target account address in the blockchain system.

In step 1, the public key of the target account address is not allocated. Therefore, the electronic device may generate an account address first. There may be a certain generation rule for the target account address. The electronic device may generate the target account address according to the generation rule. The generation rule may be configured by related technical personnel, which is not limited in this embodiment of this disclosure.

Step 2. The electronic device generates the public key of the target account address according to the public key of the debtor account address and the public key of the creditor account address.

The step 2 is similar to the step 1 in the first manner, and details are not repeated in this embodiment of this disclosure. In the second manner, the electronic device generates the target account address first, so as to allocate the public key for the target account address based on the public key of the debtor account address and the public key of the creditor account address. The public key may also enable the processing permission of the target account address to be granted to both the debtor account address and the creditor account address.

In some embodiments, an account address may further be associated with a computing device generating the account address. For example, the account address may be associated with a MAC (Media Access Control) address, or an IP address of the computing device.

Figure 5:
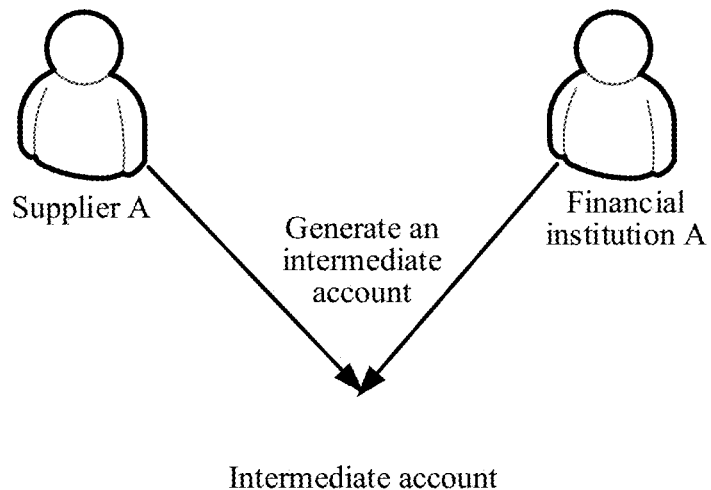
FIG. 5 is a schematic diagram of a process of generating a target account address according to an embodiment of this disclosure.

For example, as shown in FIG. 5, the process of step 402 may be as follows: generating an intermediate account for a supplier A and a financial institution A, the intermediate account being the target account address, the target account address being a multi-signature address. Specifically, the electronic device may produce the multi-signature address by using public keys of the supplier A and the financial institution A.

In a possible implementation, in the first manner and second manner, the processing permission of the generated target account address is granted to both the debtor account address and the creditor account address, and other account addresses cannot process the target account address. Specifically, when receiving a target processing instruction for the target account address, the electronic device may decrypt the target processing instruction based on the public key of the target account address. If the decryption fails, it is determined that the target processing instruction is an instruction encrypted based on a private key of an account address other than the debtor account address and the creditor account address, and the electronic device may ignore the target processing instruction. In this case, the target processing instruction is not a processing instruction from the debtor account address and the creditor account address, and does not include private key signatures of the both addresses. Therefore, the electronic device fails to decrypt the target processing instruction and may ignore the target processing instruction. In some embodiments, in such a case, the electronic device may further transmit a decryption failure message, to prompt the failure in decrypting the target processing instruction.

403. The electronic device transfers a credit rights certificate corresponding to the credit rights certificate transfer request from the debtor account address to the target account address.

The credit rights certificate transfer request is a request encrypted based on a private key of the debtor account address, the electronic device needs to transfer the credit rights certificate form the debtor account address. The electronic device may decrypt the credit rights certificate transfer request based on the public key of the target account address, so as to transfer the requested credit rights certificate based on content of the credit rights certificate transfer request. Specifically, the credit rights certificate is intended to be transferred from the debtor account address to the creditor account address. However, a confirmation instruction from the creditor account address is not yet obtained. Therefore, the credit rights certificate may be transferred to the target account address first, so that the credit rights certificate may be further transferred when the confirmation instruction is obtained subsequently.

In a possible implementation, in step 403, the process of transferring the credit rights certificate by the electronic device may be that the electronic device may change an account address of the credit rights certificate from the debtor account address to the target account address. The process of transferring the credit rights certificate may be implemented in another manner, for example, an address at which the credit rights certificate is stored is changed from the debtor account address to the target account address. This is not limited in the embodiments of this disclosure.

Figure 6:
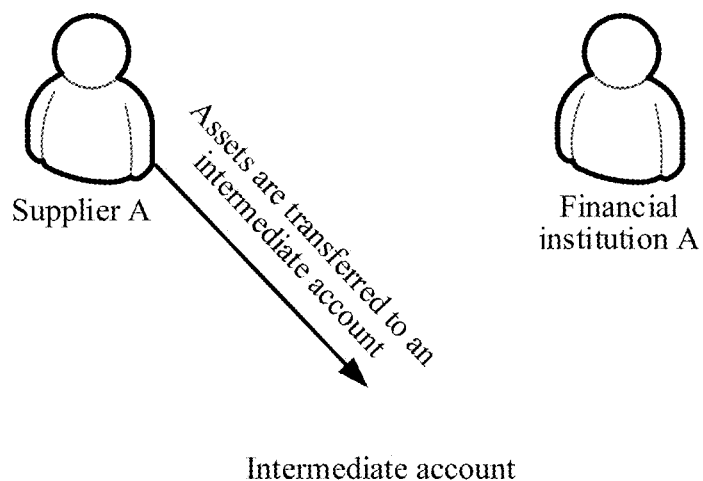
FIG. 6 is a schematic diagram of a process of transferring a credit rights certificate according to an embodiment of this disclosure.

For example, as shown in FIG. 6, after the intermediate account (the target account address) is generated, the electronic device may transfer assets in an account (the debtor account address) of the supplier A to the intermediate account based on a private key signature of the supplier A.

404. The electronic device obtains resource information of the creditor account address.

In some implementations, when the creditor account address obtains the credit rights certificate, the target resource needs to be transferred to the debtor account address. Therefore, the electronic device may alternatively first determine whether the creditor account address includes the target resource, so that a subsequent credit rights certificate transfer steps can be performed after it is determined that the creditor account address is capable of transferring the target resource.

In a possible implementation, a target device may provide a resource information obtaining service. When the electronic device needs to obtain resource information of the creditor account address, the electronic device may first transmit a resource information obtaining request to the target device, and the target device obtains and transmits the resource information of the creditor account address to the electronic device according to the resource information obtaining request, so that the electronic device receives the resource information of the creditor account address.

The electronic device may alternatively obtain the resource information of the creditor account address in another manner. For example, in a possible implementation, an account table may be maintained in the electronic device and may store resource information of each account address. The electronic device may obtain the resource information of the creditor account address from the account table. Specifically, the electronic device may obtain, based on identification information of the creditor account address, resource information corresponding to the identification information, or may directly obtain the resource information based on the creditor account address. This is not limited in the embodiments of this disclosure.

405. The electronic device obtains a confirmation instruction from the creditor account address if determining, based on the resource information of the creditor account address, that the creditor account address includes a target resource required for transferring the credit rights certificate.

After obtaining the resource information of the creditor account address, the electronic device may determine whether the creditor account address includes the target resource required for transferring the credit rights certificate, and if the creditor account address includes the target resource, the electronic device may perform step 405.

For example, if a bank or a factoring company wants to sign for acceptance of 200 thousand digital assets transferred by a secondary supplier, the bank or the factoring company needs to pay 186 thousand funds to the secondary supplier. Therefore, the electronic device may check whether a balance in an account of the bank or the factoring company is greater than or equal to 186 thousand, and if the balance is greater than or equal to 186 thousand, the bank or the factoring company is capable of paying 186 thousand and may sign for acceptance of the 200 thousand digital assets.

Step 405 shows a case that the creditor account address possesses (or owns) the target resource. There is another possible case that the creditor account address does not possess the target resource required for transferring the credit rights certificate. In such a case, the electronic device may transmit a message indicating insufficient resource, that is, the electronic device transmits an insufficient resource message when determining, based on the resource information of the creditor account address, that the creditor account address does not include the target resource required for transferring the credit rights certificate.

For example, still using the foregoing example for description. If the bank or the factoring company wants to sign for acceptance of 200 thousand digital assets transferred by the secondary supplier, the bank or the factoring company needs to pay 186 thousand funds to the secondary supplier. Therefore, the electronic device may check whether a balance in an account of the bank or the factoring company is greater than or equal to 186 thousand, and if the balance is less than 186 thousand, the bank or the factoring company is not capable of paying 186 thousand and cannot sign for acceptance of the 200 thousand digital assets.

Specifically, when the electronic device determines that the creditor account address possesses the target resource, a user of the creditor account address may perform a confirmation operation on a user equipment of the user, so that the user equipment may transmit a confirmation instruction to the electronic device. In a possible implementation, the confirmation instruction may trigger the electronic device to perform the following step 406 and step 407, to implement the process of transferring the credit rights certificate.

406. The electronic device transfers the credit rights certificate from the target account address to the creditor account address.

When obtaining the confirmation instruction from the creditor account address, the electronic device may perform step 406 and the following step 407. In some implementations, the electronic device may perform step 406 and the following step 407 within a preset period of time of obtaining the confirmation instruction from the creditor account address. A specific implementation is not limited in the embodiments of this disclosure.

The user of the creditor account address has confirmed to sign for acceptance of the credit rights certificate, and the electronic device may transfer the credit rights certificate from the target account address to the creditor account address, thereby implementing the process of transferring the credit rights certificate from the debtor account address to the creditor account address. To ensure that the rights of both parties in the transfer are not affected, the electronic device further needs to perform the following step 407 (to be described in detail below).

Figure 7:
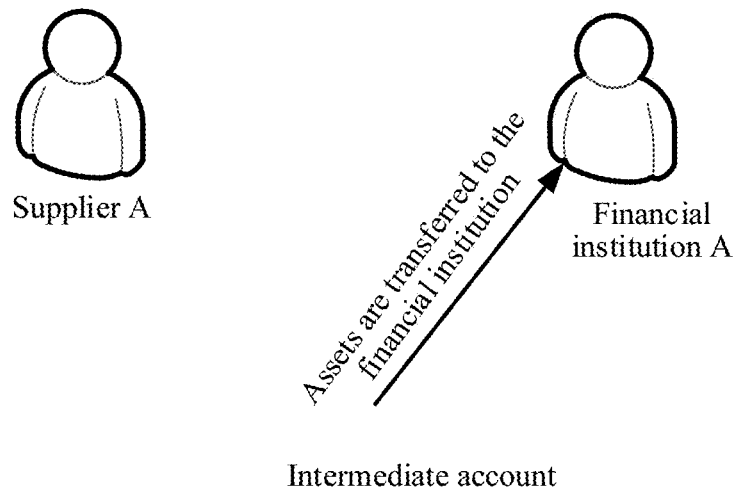
FIG. 7 is a schematic diagram of a process of transferring a credit rights certificate according to an embodiment of this disclosure.

For example, as shown in FIG. 7, when a financial institution A confirms to sign for acceptance of assets, the electronic device may transfer the assets from an intermediate account (i.e., a target account address) to an account of the financial institution A based on a private key signature of the financial institution A.

The electronic device may destroy the target account address after step 406 is performed. Alternatively, the electronic device may store the target account address, and may directly transfer the credit rights certificate by using the target account address if a creditor account address and a debtor account address included in a subsequent credit rights certificate transfer request are the same as the account addresses included in the current credit rights certificate transfer request, thereby saving the time and computing resources required for generating the target account address. In some embodiments, a valid time period may be configured for the target account address. After the valid time period, the target account address expires and a new target account address may need to be re-negotiated and re-generated upon a new transfer request.

The foregoing step 404 to step 406 are the process of transferring the credit rights certificate from the target account address to the creditor account address based on the confirmation instruction from the creditor account address. In a possible implementation, the confirmation instruction from the creditor account address may be an instruction encrypted based on a private key of the creditor account address. When receiving the confirmation instruction, the electronic device may decrypt the confirmation instruction based on the public key of the target account address, to obtain the content of the confirmation instruction and confirm that the creditor account address corresponding to the confirmation instruction is granted a permission to process the target account address, so that step 406 and the following step 407 may be performed. The decryption process may also be used to confirm that the confirmation instruction is sent from the legit creditor account.

407. The electronic device transmits a resource transfer request to the target device.

The resource transfer request is used for instructing the target device to transfer the target resource from the creditor account address to the debtor account address, the target resource being a resource that needs to be transferred in order for the creditor account address to obtain the credit rights certificate. The target device may provide a resource transfer service. When the electronic device confirms that a resource transfer is required, the electronic device may transmit the resource transfer request to the target device to request the target device to perform corresponding resource transfer processing. Step 407 is a process of transmitting the resource transfer request to the target device based on the confirmation instruction from the creditor account address.

For example, still using the foregoing example for description. Step 406 and step 407 may be that: the bank or the factoring company confirms to sign for acceptance of the 200 thousand digital assets transferred by the secondary supplier, and the electronic device transfers the 200 thousand digital assets of the secondary supplier from the target account address to the account address of the bank or the factoring company, and transfers 186 thousand funds from the account of the bank or the factoring company to the account of the secondary supplier.

The electronic device may first perform step 406 and then perform step 407, or may first perform step 407 and then perform step 406. Or step 406 and step 407 may be performed simultaneously. An execution order of step 406 and step 407 is not limited in this embodiment of this disclosure.

In a possible implementation, after step 403, step 406, or step 407 is performed, the electronic device may further record a result of the credit rights certificate transfer or a result of the resource transfer on a blockchain. Specifically, the electronic device generates, when transferring the credit rights certificate or transferring a resource on any account address, a block based on a result of the transfer, and adds the block to the blockchain if the blockchain system reaches a consensus on the block. In this case, data on the blockchain may represent the processes of generating and transferring the credit rights certificate and a corresponding resource transfer situation, thereby ensuring a data integrity on the blockchain.

Figure 8:
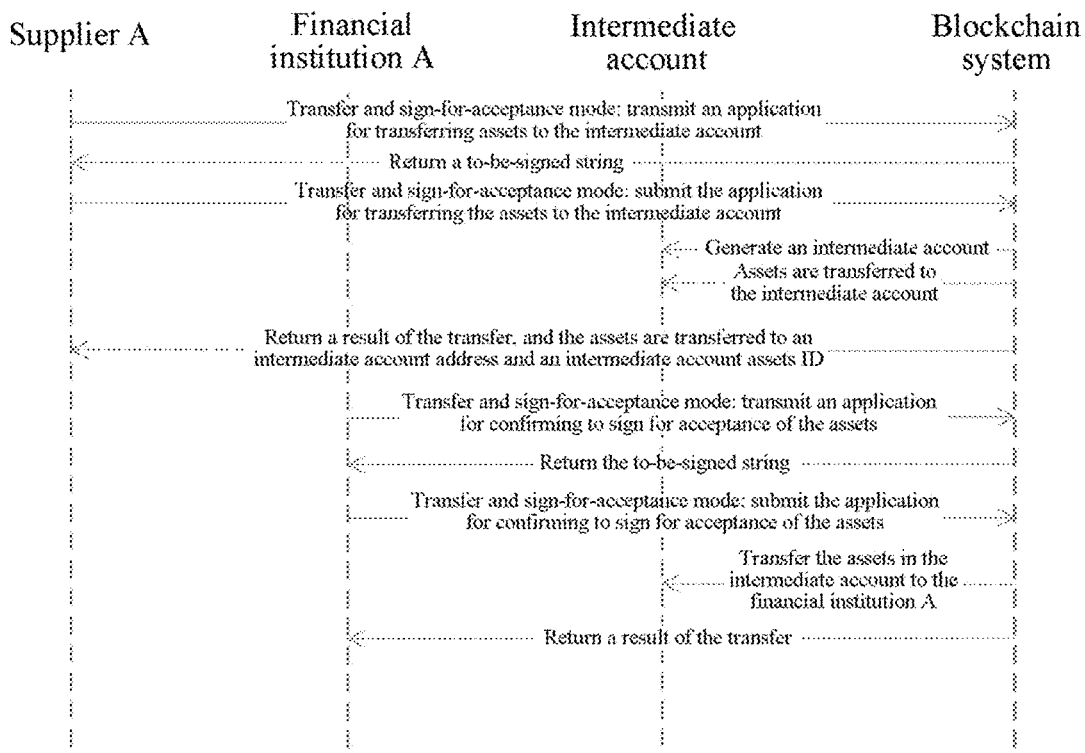
FIG. 8 is a flowchart of a transfer method for a credit rights certificate according to an embodiment of this disclosure.

The following describes the foregoing process of transferring the credit rights certificate through FIG. 8. For example, as shown in FIG. 8, a supplier A may select a transfer and sign-for-acceptance mode and transmit an application for transferring assets to an intermediate account (that is, a target account address) to a blockchain system. The blockchain system may return a to-be-signed string. After signing, the supplier A may submit the application for transferring the assets to the intermediate account in the blockchain system. The blockchain system may generate the intermediate account and transfer the assets to the intermediate account, and return a result of the transfer to the supplier A. The intermediate account address and an asset identification (ID) in the intermediate account may also be returned. This process corresponds to the foregoing step 401 to step 403. When confirming the acceptance of the assets, a financial institution A may transmit a confirmation to sign for acceptance of the assets to the blockchain system. The blockchain system may return the to-be-signed string. After signing, the financial institution A may submit the confirmation to sign for acceptance of the assets to the blockchain system. The blockchain system transfers the assets from the intermediate account to the financial institution A, and returns a result of the transfer to the financial institution A, that is, the process corresponds to the foregoing step 405 and step 406.

In this embodiment of this disclosure, when a credit rights certificate needs to be transferred, a target account address may be generated based on a creditor account address and a debtor account address. The credit rights certificate is transferred to the target account address for temporary storage, and when a confirmation instruction from the creditor account address is obtained subsequently, the credit rights certificate is transferred from the target account address to the creditor account address. By temporarily storing the credit rights certificate in the target account address, it can be ensured that the credit rights certificate is not repeatedly transferred in a period of time in which the credit rights certificate is not signed for by the creditor account address, thereby ensuring the security of the credit rights certificate transfer, avoiding a case that the credit rights certificate is further processed (e.g., an attempt to transfer to another party) before being signed for by the creditor account address, and effectively protecting the rights of both parties in the transfer.

All the foregoing technical solutions may be arbitrarily combined to form another embodiment of this disclosure, and details are not described herein again.

Figure 9:
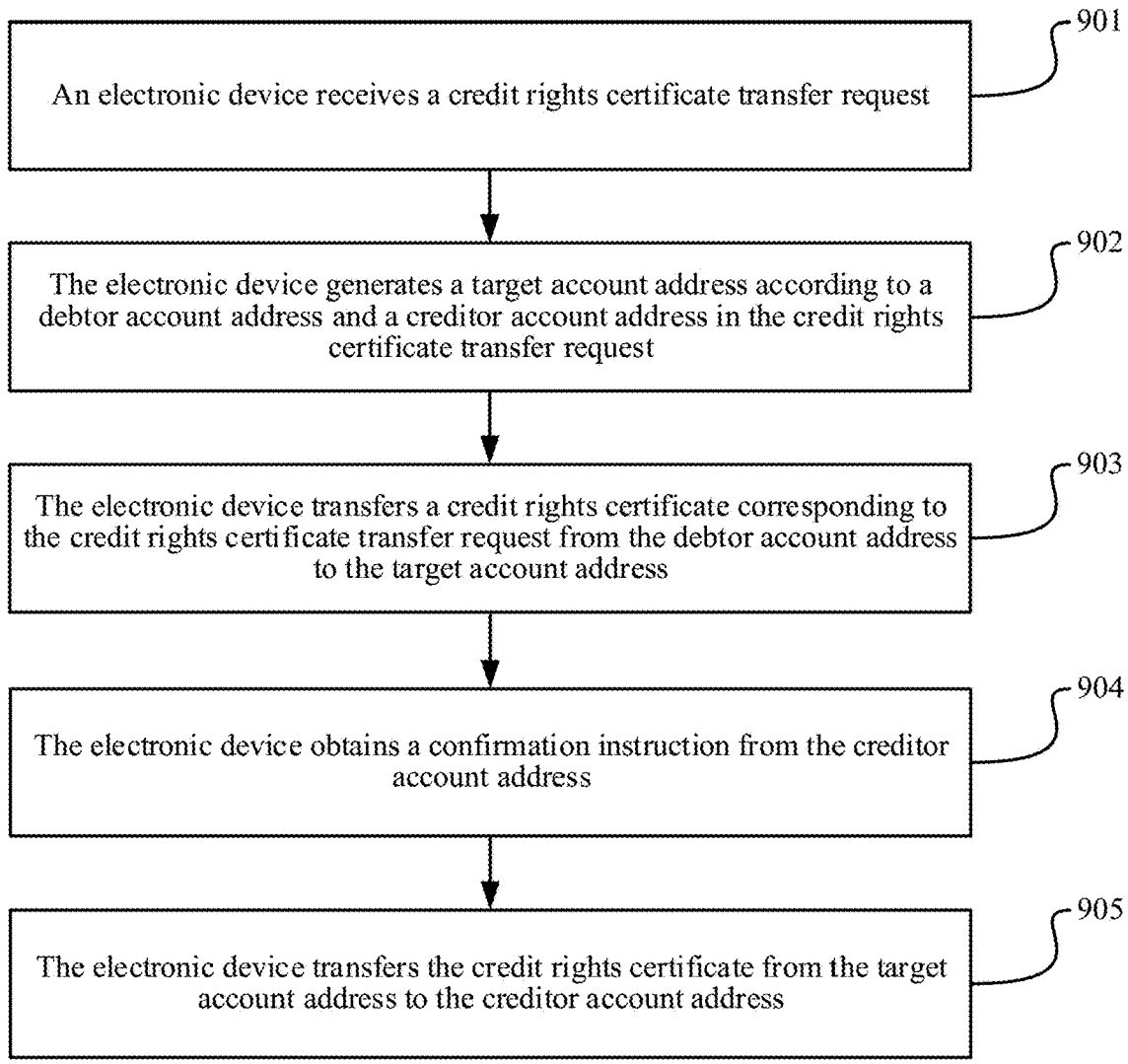
FIG. 9 is a flowchart of a transfer method for a credit rights certificate according to an embodiment of this disclosure.

FIG. 9 is a flowchart of a transfer method for a credit rights certificate according to an embodiment of this disclosure. Referring to FIG. 9, the method may include the following steps.

901. An electronic device receives a credit rights certificate transfer request.

Step 901 is similar to step 401. The electronic device may receive the credit rights certificate transfer request, perform the following steps based on the credit rights certificate transfer request: generating a target account address and transferring a credit rights certificate.

In a possible implementation, the credit rights certificate corresponding to the credit rights certificate transfer request may be an existing credit rights certificate in the foregoing debtor account address. For example, a primary supplier holds 1 million digital assets of a core company, and the primary supplier wants to transfer all of the 1 million digital assets to a secondary supplier. The primary supplier is a debtor account address in the credit rights certificate transfer request, and the secondary supplier is a creditor account address, and the 1 million digital assets are the credit rights certificate.

In another possible implementation, the credit rights certificate corresponding to the credit rights certificate transfer request may be a new credit rights certificate generated based on the existing credit rights certificate in the debtor account address. For example, a primary supplier holds 1 million digital assets of a core company, and the primary supplier wants to transfer 500 thousand digital assets in the 1 million digital assets to a secondary supplier. The primary supplier is a debtor account address in the credit rights certificate transfer request, and the secondary supplier is a creditor account address, and the 500 thousand digital assets are the credit rights certificate and are obtained based on the 1 million digital assets. Therefore, after the transfer succeeds, the primary supplier holds 500 thousand digital assets of the core enterprise, and the secondary supplier holds another 500 thousand digital assets of the primary supplier.

The two possibly implementations of the credit rights certificate corresponding to the credit rights certificate transfer request are described above. This is not limited in the embodiments of this disclosure.

902. The electronic device generates a target account address according to a debtor account address and a creditor account address in the credit rights certificate transfer request.

903. The electronic device transfers a credit rights certificate corresponding to the credit rights certificate transfer request from the debtor account address to the target account address.

904. The electronic device obtains a confirmation instruction from the creditor account address.

905. The electronic device transfers the credit rights certificate from the target account address to the creditor account address.

Step 902 to step 905 are similar to the foregoing step 402 to step 403, step 405, and step 406. In this embodiment of this disclosure, corresponding to the first manner of the transfer manner for a credit rights certificate shown in FIG. 3, the credit rights certificate is directly transferred from one party to another party, and the another party does not need to pay other funds. Therefore, after the foregoing step 903, the electronic device does not need to determine whether the creditor account address includes a target resource, and may directly transfer the credit rights certificate according to the confirmation instruction from the creditor account address. Further, after step 905, the electronic device does not need to perform steps similar to the foregoing step 407.

In this embodiment of this disclosure, when a credit rights certificate needs to be transferred, a target account address may be generated based on a creditor account address and a debtor account address. The credit rights certificate is transferred to the target account address for temporary storage, and when a confirmation instruction from the creditor account address is obtained subsequently, the credit rights certificate is transferred from the target account address to the creditor account address. By temporarily storing the credit rights certificate by using the target account address, it can be ensured that the credit rights certificate is not repeatedly transferred in a period of time in which the credit rights certificate is not signed for by the creditor account address, thereby ensuring the security of the credit rights certificate transfer, avoiding a case that the credit rights certificate is further processed before being signed for by the creditor account address, and effectively protecting the rights of both parties in the transfer.

All the foregoing technical solutions may be arbitrarily combined to form another embodiment of this disclosure, and details are not described herein again.

Figure 10:
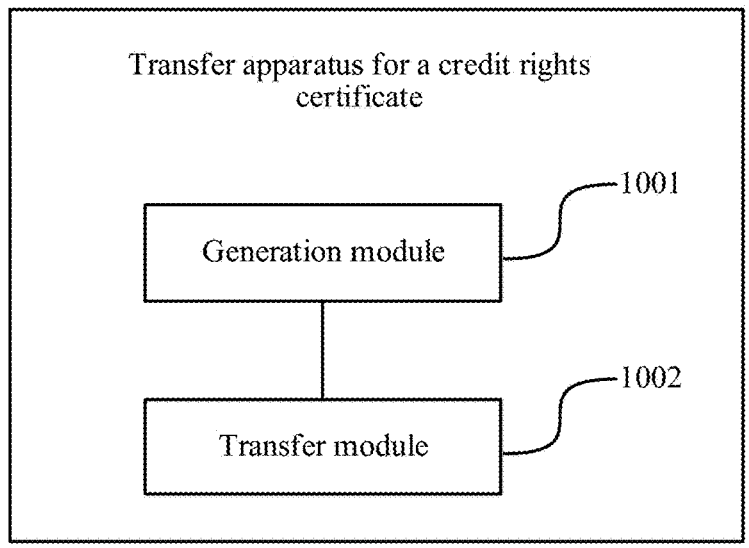
FIG. 10 is a schematic structural diagram of a transfer apparatus for a credit rights certificate according to an embodiment of this disclosure.

FIG. 10 is a schematic structural diagram of a transfer apparatus for a credit rights certificate according to an embodiment of this disclosure. The apparatus is applicable to a node device in a blockchain system. In this disclosure, a unit and a module may be hardware such as a combination of electronic circuitries; firmware; or software such as computer instructions. The unit and the module may also be any combination of hardware, firmware, and software. In some implementation, a unit may include at least one module. Referring to FIG. 10, the apparatus may include:

a generation module 1001, configured to generate a target account address according to a debtor account address and a creditor account address in a credit rights certificate transfer request, the target account address being a temporary account address used for storing a credit rights certificate; and a transfer module 1002, configured to transfer a credit rights certificate corresponding to the credit rights certificate transfer request from the debtor account address to the target account address, the transfer module 1002 being further configured to transfer the credit rights certificate from the target account address to the creditor account address based on a confirmation instruction from the creditor account address.

In a possible implementation, the generation module 1001 is configured to: generate a public key of the target account address according to a public key of the debtor account address and a public key of the creditor account address; and generate the target account address based on the public key of the target account address.

In a possible implementation, the generation module 1001 is configured to:

generate the target account address in the blockchain system; and generate a public key of the target account address according to a public key of the debtor account address and a public key of the creditor account address.

In a possible implementation, the apparatus further includes:

a decryption module, configured to decrypt, if a target processing instruction for the target account address is received, the target processing instruction based on a public key of the target account address, the target processing instruction being an instruction encrypted based on a private key of an account address other than the creditor account address and the debtor account address; and an ignoring module, configured to ignore the target processing instruction.

In a possible implementation, the credit rights certificate transfer request is a request encrypted based on a private key of the debtor account address, and the confirmation instruction from the creditor account address is an instruction encrypted based on a private key of the creditor account address.

In a possible implementation, the transfer module 1002 is configured to:

obtain resource information of the creditor account address;

obtain a confirmation instruction from the creditor account address when determining, based on the resource information of the creditor account address, that the creditor account address includes a target resource required for transferring the credit rights certificate; and transfer the credit rights certificate from the target account address to the creditor account address.

In a possible implementation, the apparatus further includes:

a first transmitting module, configured to transmit an insufficient resource message when determining, based on the resource information of the creditor account address, that the creditor account address does not include the target resource required for transferring the credit rights certificate.

In a possible implementation, the apparatus further includes:

a second transmitting module, configured to transmit a resource transfer request to a target device based on the confirmation instruction from the creditor account address, the resource transfer request being used for instructing the target device to transfer a target resource from the creditor account address to the debtor account address, the target resource being a resource that needs to be transferred for the creditor account address to obtain the credit rights certificate.

In a possible implementation, the generation module 1001 is further configured to generate, when transferring the credit rights certificate or performing a resource transfer on any account address, a block based on a result of the transfer, and add the block to a blockchain if the blockchain system reaches a consensus on the block.

According to the apparatus provided in this embodiment of this disclosure, when a credit rights certificate needs to be transferred, a target account address may be generated based on a creditor account address and a debtor account address. The credit rights certificate may be transferred to the target account address for temporary storage, and when a confirmation instruction from the creditor account address is obtained subsequently, the credit rights certificate is transferred from the target account address to the creditor account address. By temporarily storing the credit rights certificate by using the target account address, it can be ensured that the credit rights certificate is not repeatedly transferred in a period of time in which the credit rights certificate is not signed for by the creditor account address, thereby ensuring the security of the credit rights certificate transfer, avoiding a case that the credit rights certificate is further processed before being signed for by the creditor account address, and effectively protecting the rights of both parties in the transfer.

When the credit rights certificate is transferred by using the transfer apparatus for a credit rights certificate provided in the foregoing embodiments, it is illustrated with an example of division of each functional module. In the practical application, the function distribution may be finished by different functional modules according to the requirements, that is, the internal structure of the device is divided into different functional modules, to implement all or some of the functions described above. In addition, the transfer apparatus for a credit rights certificate provided in the foregoing embodiments and the embodiments of the transfer method for a credit rights certificate belong to one conception. For the specific implementation process, reference is made to the method embodiments, and details are not described herein again.

Figure 11:
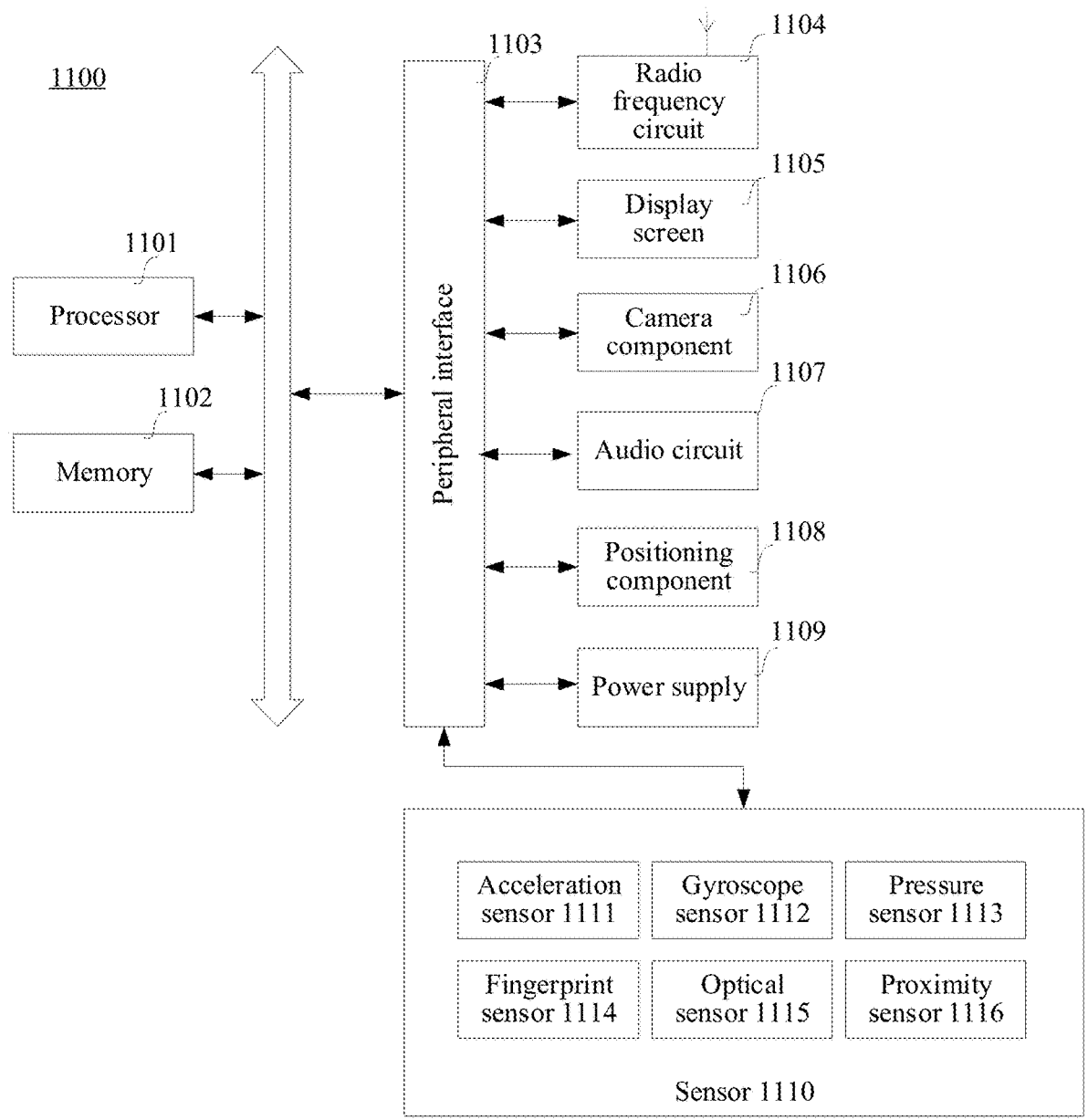
FIG. 11 is a schematic structural diagram of a terminal according to an embodiment of this disclosure.
Figure 12:
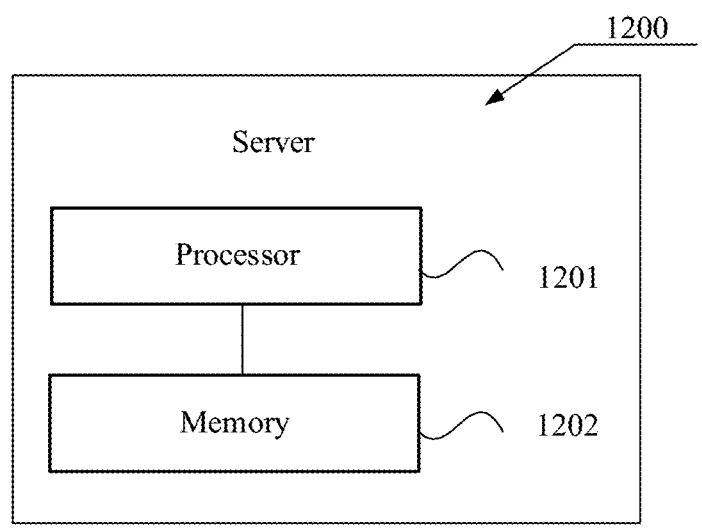
FIG. 12 is a schematic structural diagram of a server according to an embodiment of this disclosure.

The electronic device may be provided as a terminal shown in FIG. 11, or may be provided as a server shown in FIG. 12. This is not limited in the embodiments of this disclosure.

FIG. 11 is a schematic structural diagram of a terminal according to an embodiment of this disclosure. The terminal 1100 may be a smartphone, a tablet computer, a moving picture experts group audio layer III (MP3) player, a moving picture experts group audio layer IV (MP4) player, a notebook computer, or a desktop computer. The terminal 1100 may also be referred to other names such as user equipment, a portable terminal, a laptop terminal, or a desktop terminal.

Generally, the terminal 1100 includes a processor 1101 and a memory 1102.

The processor 1101 may include one or more processing cores, and may be, for example, a 4-core processor or an 8-core processor. The processor 1101 may be implemented in at least one hardware form of a digital signal processor (DSP), a field-programmable gate array (FPGA), and a programmable logic array (PLA). The processor 1101 may alternatively include a main processor and a coprocessor. The main processor is a processor that is configured to process data in an awake state, also referred to as a central processing unit (CPU), and the coprocessor is a low-power processor that is configured to process data in an idle state. In some embodiments, the processor 1101 may be integrated with a graphics processing unit (GPU). The GPU is responsible for rendering and drawing content to be displayed by a display screen. In some embodiments, the processor 1101 may further include an artificial intelligence (AI) processor. The AI processor is configured to process a calculation operation related to machine learning.

The memory 1102 may include one or more computer-readable storage media. The computer-readable storage medium may be non-transient. The memory 1102 may further include a high-speed random access memory, and a non-transitory memory such as one or more magnetic disk storage devices and a flash memory device. In some embodiments, the non-transient computer-readable storage medium in the memory 1102 is configured to store at least one instruction, and the at least one instruction being configured to be executed by the processor 1101 to implement the transfer method for a credit rights certificate provided in the method embodiments of this disclosure.

In some embodiments, the terminal 1100 include: a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. Specifically, the peripheral includes: at least one of a radio frequency (RF) circuit 1104, a touch display screen 1105, a camera component 1106, an audio circuit 1107, a positioning component 1108, and a power supply 1109.

The peripheral interface 1103 may be configured to connect the at least one peripheral related to input/output (I/O) to the processor 1101 and the memory 1102. In some embodiments, the processor 1101, the memory 1102, and the peripheral interface 1103 are integrated on the same chip or circuit board. In some other embodiments, any one or two of the processor 1101, the memory 1102, and the peripheral interface 1103 may be implemented on a separate chip or circuit board. This is not limited in this embodiment.

The RF circuit 1104 is configured to receive and transmit an RF signal, also referred to as an electromagnetic signal. The RF circuit 1104 communicates with a communication network and another communication device by using the electromagnetic signal. The RF circuit 1104 converts an electric signal into an electromagnetic signal for transmission, or converts a received electromagnetic signal into an electric signal. In some embodiments, the RF circuit 1104 includes: an antenna system, an RF transceiver, one or more amplifiers, a tuner, an oscillator, a digital signal processor, a codec chip set, a subscriber identity module card, and the like. The RF circuit 1104 may communicate with another terminal by using at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 1104 may further include a circuit related to near field communication (NFC). This is not limited in this application.

The display screen 1105 is configured to display a user interface (UI). The UI may include a graphic, text, an icon, a video, and any combination thereof. When the display screen 1105 is a touch display screen, the display screen 1105 is also capable of collecting a touch signal on or above a surface of the display screen 1105. The touch signal may be inputted into the processor 1101 as a control signal for processing. In this case, the display screen 1105 may be further configured to provide a virtual button and/or a virtual keyboard, also referred to as a soft button and/or a soft keyboard. In some embodiments, there may be one display screen 1105, disposed on a front panel of the terminal 1100. In some other embodiments, there may be at least two display screens 1105, respectively disposed on different surfaces of the terminal 1100 or designed in a foldable shape. In still some other embodiments, the display screen 1105 may be a flexible display screen, disposed on a curved surface or a folded surface of the terminal 1100. Even, the display screen 1105 may be further set to have a non-rectangular irregular graph, that is, a special-shaped screen. The display screen 1105 may be prepared by using materials such as a liquid crystal display (LCD), an organic light-emitting diode (OLED), or the like.

The camera component 1106 is configured to collect an image or a video. In some embodiments, the camera component 1106 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1106 may further include a flash. The flash may be a single color temperature flash or a double color temperature flash. The double color temperature flash refers to a combination of a warm flash and a cold flash, and may be configured to perform light ray compensation at different color temperatures.

The audio circuit 1107 may include a microphone and a speaker. The microphone is configured to collect sound waves of a user and an environment, and convert the sound waves into electrical signals and input the electrical signals into the processor 1101 for processing, or input the electrical signals into the RF circuit 1104 to implement speech communication. For stereo collection or noise reduction, there may be a plurality of microphones, disposed at different portions of the terminal 1100 respectively. The microphone may alternatively be a microphone array or an omnidirectional collection microphone. The speaker is configured to convert electrical signals from the processor 1101 or the RF circuit 1104 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 1107 may further include an earphone jack.

The positioning component 1108 is configured to position a current geographic location of the terminal 1100 for implementing navigation or a location-based service (LBS). The positioning component 1108 may be a positioning component based on the global positioning system (GPS) of the United States, the BeiDou Navigation Satellite System (BDS) of China, the GLONASS System of Russia, or the GALILEO System of the European Union.

The power supply 1109 is configured to supply power to components in the terminal 1100. The power supply 1109 may be an alternating current, a direct current, a primary battery, or a rechargeable battery. When the power source 1109 includes the rechargeable battery, the rechargeable battery may be a wired rechargeable battery or a wireless rechargeable battery. The rechargeable battery may be further configured to support a fast charge technology.

In some embodiments, the terminal 1100 may also include one or more sensors 1110. The one or more sensors 1110 include, but are not limited to, an acceleration sensor 1111, a gyroscope sensor 1112, a pressure sensor 1113, a fingerprint sensor 1114, an optical sensor 1115, and a proximity sensor 1116.

The acceleration sensor 1111 may detect the magnitude of acceleration on three coordinate axes of a coordinate system established by the terminal 1100. For example, the acceleration sensor 1111 may be configured to detect a component of gravity acceleration on the three coordinate axes. The processor 1101 may control, according to a gravity acceleration signal collected by the acceleration sensor 1111, the touch display screen 1105 to display the user interface in a frame view or a portrait view. The acceleration sensor 1111 may be further configured to collect motion data of a game or a user.

The gyroscope sensor 1112 may detect a body direction and a rotation angle of the terminal 1100. The gyroscope sensor 1112 may cooperate with the acceleration sensor 1111 to collect a 3D action by the user on the terminal 1100. The processor 1101 may implement the following functions according to data collected by the gyroscope sensor 1112: motion sensing (for example, the UI is changed according to a tilt operation of the user), image stabilization during shooting, game control, and inertial navigation.

The pressure sensor 1113 may be disposed at a side frame of the terminal 1100 and/or a lower layer of the touch display screen 1105. When the pressure sensor 1113 is disposed on the side frame of the terminal 1100, a holding signal of the user on the terminal 1100 may be detected. The processor 1101 performs left and right hand recognition or a quick operation according to the holding signal collected by the pressure sensor 1113. When the pressure sensor 1113 is disposed on the low layer of the touch display screen 1105, the processor 1101 controls, according to a pressure operation of the user on the touch display screen 1105, an operable control on the UI. The operable control includes at least one of a button control, a scroll bar control, an icon control, and a menu control.

The fingerprint sensor 1114 is configured to collect a fingerprint of the user. The processor 1101 identifies an identity of the user according to the fingerprint collected by the fingerprint sensor 1114, or the fingerprint sensor 1114 identifies an identity of the user according to the collected fingerprint. When the identity of the user is identified as a trusted identity, the processor 1101 authorizes the user to perform a related sensitive operation. The sensitive operation includes unlocking a screen, viewing encrypted information, downloading software, payment, changing settings, and the like. The fingerprint sensor 1114 may be disposed on a front face, a back face, or a side face of the terminal 1100. When a physical button or a vendor logo is disposed on the terminal 1100, the fingerprint 1114 may be integrated with the physical button or the vendor logo.

The optical sensor 1115 is configured to collect ambient light intensity. In an embodiment, the processor 1101 may control display luminance of the touch display screen 1105 according to the ambient light intensity collected by the optical sensor 1115. Specifically, when the ambient light intensity is relatively high, the display luminance of the touch display screen 1105 is increased. When the ambient light intensity is relatively low, the display luminance of the touch display screen 1105 is reduced. In another embodiment, the processor 1101 may further dynamically adjust a camera parameter of the camera component 1106 according to the ambient light intensity collected by the optical sensor 1115.

The proximity sensor 1116, also referred to as a distance sensor, is generally disposed on the front panel of the terminal 1100. The proximity sensor 1116 is configured to collect a distance between the user and the front surface of the terminal 1100. In an embodiment, when the proximity sensor 1116 detects that the distance between the user and the front surface of the terminal 1100 gradually becomes smaller, the touch display screen 1105 is controlled by the processor 1101 to switch from a screen-on state to a screen-off state. If the proximity sensor 1116 detects that the distance between the user and the front surface of the terminal 1100 gradually becomes larger, the touch display screen 1105 is controlled by the processor 1101 to switch from the screen-off state to the screen-on state.

A person skilled in the art may understand that a structure shown in FIG. 11 constitutes no limitation on the terminal 1100, and the terminal may include more or fewer components than those shown in the figure, or some components may be combined, or a different component deployment may be used.

FIG. 12 is a schematic structural diagram of a server according to an embodiment of this disclosure. The server 1200 may vary greatly due to different configurations or performance, and may include one or more processors (CPUs) 1201 and one or more memories 1202. The memory 1202 stores at least one computer-readable instruction, the at least one computer-readable instruction being loaded and executed by the processor 1201 to implement the transfer method for a credit rights certificate provided in the foregoing method embodiments. Certainly, the server may further include components such as a wired or wireless network interface, a keyboard, and an input/output interface, to facilitate inputs/outputs. The server may further include another component configured to implement functions of a device, and details are not described herein again.

In an exemplary embodiment, a computer-readable storage medium, such as a memory including a computer-readable instruction, is further provided, and the computer-readable instruction may be executed by a processor to complete the transfer method for a credit rights certificate in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

A person of ordinary skill in the art may understand that all or some of the steps of the embodiments may be implemented by hardware or a computer-readable instruction instructing related hardware. The computer-readable instruction may be stored in a computer-readable storage medium. The storage medium may be an ROM, a magnetic disk, an optical disc, or the like.

The foregoing descriptions are merely exemplary embodiments of this disclosure, but are not intended to limit this application. Any modification, equivalent replacement, or improvement made within the spirit and principle of this application shall fall within the protection scope of this application.

What is claimed is:

1. A method for transferring a credit rights certificate, performed by an electronic device in a blockchain system, the method comprising:
generating, in the blockchain system, a target account address according to a debtor account address and a creditor account address in a credit rights certificate transfer request, the target account address being a temporary account address used for storing a credit rights certificate, and each of the debtor account address and the creditor account address being managed by multiple parties based on an M-N and public-private multi signature process, wherein
M is a quantity of keys required for unlocking at least one of the debtor account address and the creditor account address;
N is a quantity of managers holding and operating the keys at the at least one of the debtor account address and the creditor account address;
N is greater than or equals to M;
the M keys comprise a public key for the target account address specifically generated based on other public keys among the M keys for the creditor account address and the debtor account address; and
the target account address is generated based on the public key of the target using a one-way hash function;
transferring a credit rights certificate corresponding to the credit rights certificate transfer request from the debtor account address to the target account address after verifying, using the public key for the target account address, the credit rights certificate transfer request digitally signed and encrypted using a private key of the debtor account address; and
transferring the credit rights certificate from the target account address to the creditor account address based on a confirmation instruction from the creditor account address after verifying, using the public key for the target account address, the confirmation instruction digitally signed and encrypted using a private key of the creditor account address.

2. The method according to claim 1, wherein transferring the credit rights certificate from the target account address to the creditor account address based on the confirmation instruction from the creditor account address comprises:
obtaining resource information of the creditor account address;
determining, based on the resource information of the creditor account address, whether the creditor account address comprises a target resource required for transferring the credit rights certificate; and
in response to determining that the creditor account address comprising the target resource, obtaining the confirmation instruction from the creditor account address, and transferring the credit rights certificate from the target account address to the creditor account address.

3. The method according to claim 2, further comprising:
in response to determining that the creditor account address not comprising the target resource, transmitting a resource insufficient message.

4. The method according to claim 1, further comprising:
transmitting a resource transfer request to a target device based on the confirmation instruction from the creditor account address, the resource transfer request being used for instructing the target device to transfer a target resource from the creditor account address to the debtor account address, the target resource being a resource required for the creditor account address to obtain the credit rights certificate.

5. The method according to claim 1, further comprising:
when transferring the credit rights certificate, generating a block based on a result of the transfer, and adding the block to a blockchain in the blockchain system in response to the blockchain system reaching a consensus on the block.

6. A device in a blockchain system for transferring a credit rights certificate, comprising a memory for storing computer instructions and a processor in communication with the memory, wherein, when the processor executes the computer instructions, the processor is configured to cause the device to:
Generate, in the blockchain system, a target account address according to a debtor account address and a creditor account address in a credit rights certificate transfer request, the target account address being a temporary account address used for storing a credit rights certificate, and each of the debtor account address and the creditor account address being managed by multiple parties based on an M-N and public-private multi signature process, wherein
M is a quantity of keys required for unlocking at least one of the debtor account address and the creditor account address;
N is a quantity of managers holding and operating the keys at the at least one of the debtor account address and the creditor account address;
N is greater than or equals to M; and
the M keys comprise a public key for the target account address specifically generated based on other public keys among the M keys for the creditor account address and the debtor account address;
the target account address is generated based on the public key of the target using a one-way hash function;
transfer a credit rights certificate corresponding to the credit rights certificate transfer request from the debtor account address to the target account address after verifying, using the public key for the target account address, the credit rights certificate transfer request digitally signed and encrypted using a private key of the debtor account address; and
transfer the credit rights certificate from the target account address to the creditor account address based on a confirmation instruction from the creditor account address after verifying, using the public key for the target account address, the confirmation instruction digitally signed and encrypted using a private key of the creditor account address.

7. The device according to claim 6, wherein, when the processor is configured to cause the device to transfer the credit rights certificate from the target account address to the creditor account address based on the confirmation instruction from the creditor account address, the processor is configured to cause the device to:
obtain resource information of the creditor account address;
determine, based on the resource information of the creditor account address, whether the creditor account address comprises a target resource required for transferring the credit rights certificate; and
in response to determining that the creditor account address comprising the target resource, obtain the confirmation instruction from the creditor account address, and transfer the credit rights certificate from the target account address to the creditor account address.

8. The device according to claim 7, wherein, when the processor executes the computer instructions, the processor is configured to further cause the device to:
in response to determining that the creditor account address not comprising the target resource, transmit a resource insufficient message.

9. The device according to claim 6, wherein, when the processor executes the computer instructions, the processor is configured to further cause the device to:
transmit a resource transfer request to a target device based on the confirmation instruction from the creditor account address, the resource transfer request being used for instructing the target device to transfer a target resource from the creditor account address to the debtor account address, the target resource being a resource required for the creditor account address to obtain the credit rights certificate.

10. The device according to claim 6, wherein, when the processor executes the computer instructions, the processor is configured to further cause the device to:
when transferring the credit rights certificate, generate a block based on a result of the transfer, and add the block to a blockchain in the blockchain system in response to the blockchain system reaching a consensus on the block.

11. A non-transitory storage medium for storing computer readable instructions, the computer readable instructions, when executed by a processor of a device in a blockchain system, causing the processor to:
generate, in the blockchain system, a target account address according to a debtor account address and a creditor account address in a credit rights certificate transfer request, the target account address being a temporary account address used for storing a credit rights certificate,_ and each of the debtor account address and the creditor account address being managed by multiple parties based on an M-N and public-private multi signature process, wherein
M is a quantity of keys required for unlocking at least one of the debtor account address and the creditor account address;
N is a quantity of managers holding and operating the keys at the at least one of the debtor account address and the creditor account address;
N is greater than or equals to M;
the M keys comprise a public key for the target account address specifically generated based on other public keys among the M keys for the creditor account address and the debtor account address; and
the target account address is generated based on the public key of the target using a one-way hash function;
transfer a credit rights certificate corresponding to the credit rights certificate transfer request from the debtor account address to the target account address after verifying, using the public key for the target account address, the credit rights certificate transfer request digitally signed and encrypted using a private key of the debtor account address; and
transfer the credit rights certificate from the target account address to the creditor account address based on a confirmation instruction from the creditor account address after verifying, using the public key for the target account address, the confirmation instruction digitally signed and encrypted using a private key of the creditor account address.

12. The non-transitory storage medium according to claim 11, wherein, when the computer readable instructions cause the processor to generate the target account address according to the debtor account address and the creditor account address in the credit rights certificate transfer request, the computer readable instructions cause the processor to:
generate a public key of the target account address according to a public key of the debtor account address and a public key of the creditor account address; and
generate the target account address based on the public key of the target account address.

* * * * *